(12) United States Patent
Cornils et al.

(10) Patent No.: US 7,065,643 B1
(45) Date of Patent: Jun. 20, 2006

(54) NETWORK COMPROMISE RECOVERY METHODS AND APPARATUS

(75) Inventors: Curtis Lee Cornils, Chandler, AZ (US); Erwin Perry Comer, Queen Creek, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/536,577

(22) Filed: Mar. 28, 2000

(51) Int. Cl.
*H04K 1/00* (2006.01)
*H04L 9/12* (2006.01)
*H04L 9/00* (2006.01)

(52) U.S. Cl. ............... 713/163; 380/273; 380/279; 380/284

(58) Field of Classification Search .............. 380/277, 380/278, 281, 282, 284, 285, 279, 273; 713/163
See application file for complete search history.

(56) References Cited

U.S. PATENT DOCUMENTS

| | | | |
|---|---|---|---|
| 5,592,552 A * | 1/1997 | Fiat | 713/163 |
| 5,748,736 A * | 5/1998 | Mittra | 713/163 |
| 6,195,751 B1 * | 2/2001 | Caronni et al. | 713/163 |
| 6,263,435 B1 * | 7/2001 | Dondeti et al. | 713/163 |
| 6,584,566 B1 * | 6/2003 | Hardjono | 713/163 |
| 6,684,331 B1 * | 1/2004 | Srivastava | 713/163 |
| 6,735,312 B1 * | 5/2004 | Abdalla et al. | 380/239 |
| 6,880,081 B1 * | 4/2005 | Itkis | 713/163 |

* cited by examiner

*Primary Examiner*—Jacques Louis-Jacques
*Assistant Examiner*—Matthew Heneghan

(57) ABSTRACT

A secure communications system (100, FIG. 1) with a compromised communications node can quickly recover from the compromised condition by sending re-keying messages using a key encryption key hierarchy (200, FIG. 2). Each communications node (330, FIG. 3) includes a memory (300, FIG. 3) with a list of tier-group specific key encryption keys, and whenever a message arrives that is encrypted with a key encryption key in the list, the communications node decrypts the message. When the message includes a new traffic encryption key, the communications node has been re-keyed. Key encryption keys are managed hierarchically such that many communications nodes can be re-keyed with very few broadcast messages, thereby saving communications resources.

9 Claims, 4 Drawing Sheets

NETWORK COMPROMISE RECOVERY METHODS AND APPARATUS

FIELD OF THE INVENTION

The present invention relates generally to communications systems that employ encryption keys and, in particular, to the re-keying of nodes in such communications systems.

BACKGROUND OF THE INVENTION

Many modern communications systems are "secure." A secure system is one that gives communications privileges to authorized users and denies communications privileges to unauthorized users. Some such systems accomplish security by employing "encryption keys." Encryption keys are also known as "authentication keys," "authentication certificates" or simply "keys." Keys are distributed to communications nodes within the system. Authorized users, during secure communications sessions, access the nodes, and encrypt and decrypt messages using the keys.

Security can become compromised when an unauthorized user gains access to a node that has a valid key. When this occurs, the node accessed by the unauthorized user is considered compromised. The unauthorized user of a compromised node can decrypt (and steal) messages and can also be disruptive to the system by encrypting and sending unauthorized messages. Examples of disruption include gaining access to the system without paying fees, or gaining access to classified material. Examples of unauthorized users include "hackers" who break into a system and thieves who physically take possession of a system node with a valid key. Specific examples include people who steal television service by cracking the video encryption key, and cellular service thieves who capture authentication codes and then replicate phones.

After the system becomes compromised, system security can be regained by "excising" the compromised node from the communications system. Nodes can be excised by "re-keying" all nodes except the compromised node. For example, when one compromised node exists in a system that includes ten nodes, the compromised node can be excised by sending the remaining nine nodes a new encryption key using nine separate messages.

When large numbers of nodes exist, sending a new key to each node is expensive in terms of time and bandwidth. For example, when one compromised node exists in a system having 10,000 total nodes, re-keying the remaining nodes is accomplished by sending 9,999 messages. This can consume considerable system resources. As the communications system grows larger, excising a compromised node becomes even more expensive.

Accordingly, a significant need exists for methods and apparatus for efficiently re-keying large numbers of nodes in communications systems.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and wherein:

DETAILED DESCRIPTION OF THE DRAWINGS

In the following detailed description, reference is made to the accompanying drawings that show, by way of illustration, specific embodiments in which the invention may be practiced. It is to be understood that other embodiments may be utilized and structural changes may be made without departing from the scope of the present invention.

The methods and apparatus of the present invention provide an efficient mechanism to re-key a large number of nodes in a communications system. Nodes encrypt normal traffic using a traffic encryption key. In some embodiments, all nodes use the same traffic encryption key for encoding communications. When a new traffic encryption key is issued to a node, it is encrypted with a key encryption key. Each node has a number of key encryption keys, and when a new traffic encryption key is encrypted with one of these keys, the node can decrypt the new traffic encryption key. The methods and apparatus of the present invention provide a hierarchy of key encryption keys such that large numbers of nodes can be re-keyed at a time, thereby saving time and communications bandwidth. The specific examples described herein refer to encryption. One skilled in the art will understand that the methods and apparatus of the present invention also apply to authentication.

Figure 1:
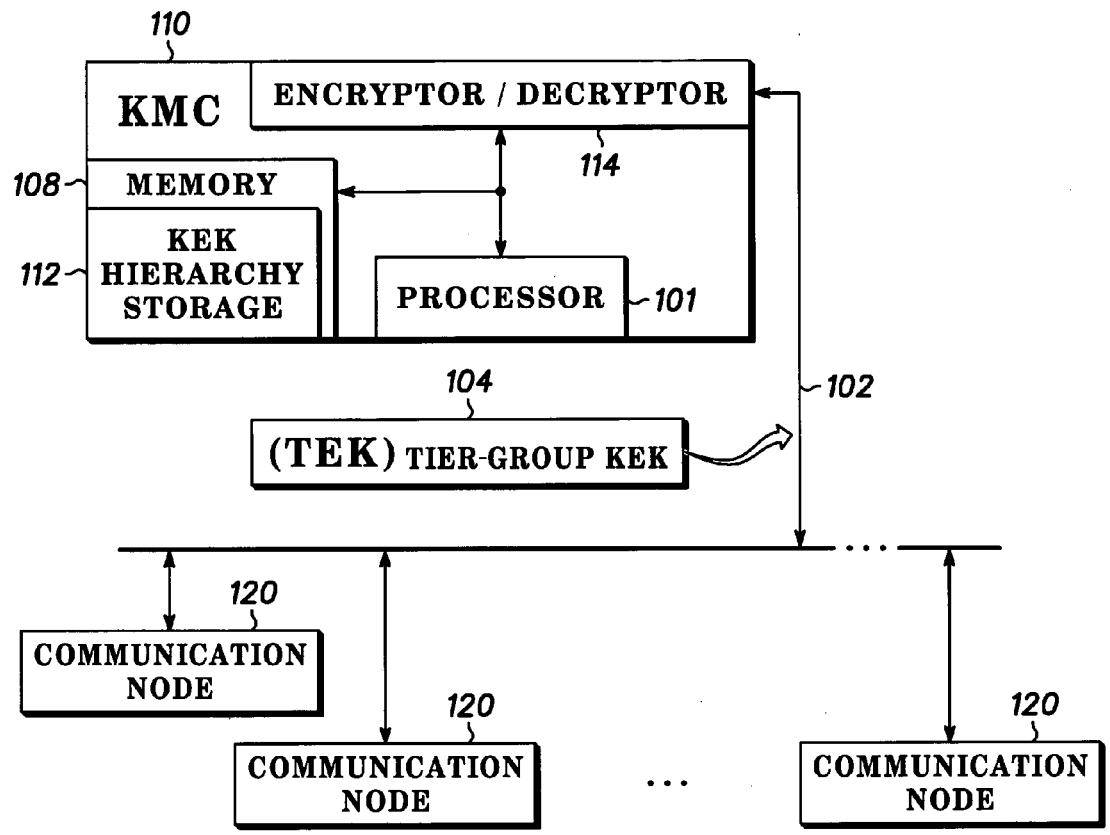
FIG. 1 shows a communications system in accordance with a preferred embodiment of the present invention.

Turning now to the drawings in which like reference characters indicate corresponding elements throughout the several views, attention is first directed to FIG. 1. FIG. 1 shows a communications system in accordance with a preferred embodiment of the present invention. Communications system 100 includes key management center (KMC) 110 and communications nodes 120. Communications system 100 can be any type of network having a community of nodes capable of information sharing Examples include a wide area network such as the Internet, a local area network, a virtual private network, or the like. KMC 110 communicates with nodes 120 using channel 102. Channel 102 represents any type of communications medium and can comprise wireline, wireless, and/or a combination of wireline and wireless communications media. Communications nodes can be any type of network node capable of communicating with other nodes over channel 102. Examples include, but are not limited to, cellular phones, personal digital assistants, handheld wireless computers, computers on the Internet, and computers on secure classified networks.

Communications nodes 120 are communications nodes that are authorized users of communications system 100. In a preferred embodiment, communications system 100 is a secure communications system, and communications nodes 120 each have access to traffic encryption keys (TEK) that allow secure communications amongst each other and with KMC 110. In other embodiments, communications system 100 is a communications system that provides services, such as a cellular phone communications system. In these embodiments, communications nodes 120 are authorized users only when authorized by a cellular service provider. In some instances, such as when a use does not pay his or her bill, a user may become an unauthorized user.

An unauthorized user is a user who has access, but should not have access, to information present on channel 102. Examples include, but are not limited to, a cellular user who has not paid his or her bill or is trying to steal service, or a hacker who has illegally gained access to communications system 100. When communications system 100 is a secure communications system used in military applications, an example of an unauthorized user is an unfriendly user who has gained physical access to a communications node 120. When an unauthorized user gains access to a node 120, communications system 100 is compromised, and it is desirable to excise the compromised node from the system. It may be desirable to perform the excision quickly. For example in a battlefield situation where an enemy has overrun a position and has taken possession of a keyed communication device, a quick excision of the device in enemy hands is quite desirable.

Excising a compromised node from the system can be accomplished by re-keying every node 120 in the communications system except for the compromised node. Each node 120 includes a traffic encryption key (TEK) and one or more key encryption keys (KEK). Communications nodes encrypt transmissions intended for other nodes using the TEK. As long as only authorized users have access to the TEK, the system remains secure. When an unauthorized user gains access to the TEK, it is desirable to change the TEK in such a way that every node except the compromised node receives the new TEK.

KEKs are used to encrypt TEKs for dissemination in communications system 100. For example, KMC 110 can encrypt a TEK, using a KEK, and can then transmit an encrypted TEK on channel 102.

In a preferred embodiment, KMC 110 comprises a processor 101 and a memory 108, which can be, for example, a random access memory (RAM) or other suitable type of computer-readable medium. Processor 101, which can be of any suitable type, executes computer instructions stored in memory 108. Processor 101 can also access data from memory 108 and store data into memory 108.

Memory 108 contains one or more data structure in the form of KEK hierarchy storage 112. KEKs from KEK hierarchy storage 112 are used by encryptor/decryptor 114 to encrypt a new TEK for transmissions to communications nodes 120.

One skilled in the art will appreciate that KMC 110, as shown in FIG. 1, is simplified for the purposes of describing a particular embodiment of the present invention.

An encrypted TEK is shown in encrypted message 104. Encrypted message 104 shows a TEK that is encrypted using a tier-group specific KEK. Tier-group specific KEKs are explained in more detail below with reference to FIG. 2. A subset of communications nodes 120 has access to the tier-group specific KEK shown in encrypted message 104. This subset of communications nodes 120 does not include the compromised node; i.e., it excludes the compromised node. When a compromised node is being excised from communications system 100, KMC 110 transmit a number of encrypt messages 104 using different tier-group specific KEKs until the compromised node is excised from communications system 100.

In a preferred embodiment, along with the new TEK, message 104 includes a time of effectivity set to a specific one in the future such that a time delay exists between the time when the communications nodes receive a new TEK and the time when the new TEK becomes effective. Preferably, the time of effectivity is set such that all communications nodes can receive the new TEK prior to the time of effectivity.

In some embodiments, asymmetric cryptography, or public-private key cryptography is employed. In these embodiments, compromised revocation lists (CRL) can be broadcast to communications nodes 120 utilizing the methods and apparatus of the present invention. A compromised revocation list can identify the compromised node. The compromised revocation lists can be sent to communications nodes 120 encrypted using tier-group specific KEKs such that compromised node does not receive the compromised recovery list. In some embodiments, a list of expired keys is disseminated to authorized users. Authorized users can then refrain from communicating with communications nodes using expired keys.

In some embodiments, symmetric cryptography or shared private key cryptography is employed. In these embodiments, TEKs are sent to communications nodes 120 encrypted using tier-group specific KEKs such that the compromised node does not receive the new traffic encryption key. The remainder of this description, for ease of explanation, focuses on symmetric cryptography embodiments. This manner of presentation is not intended to be limiting in any way.

Figure 2:
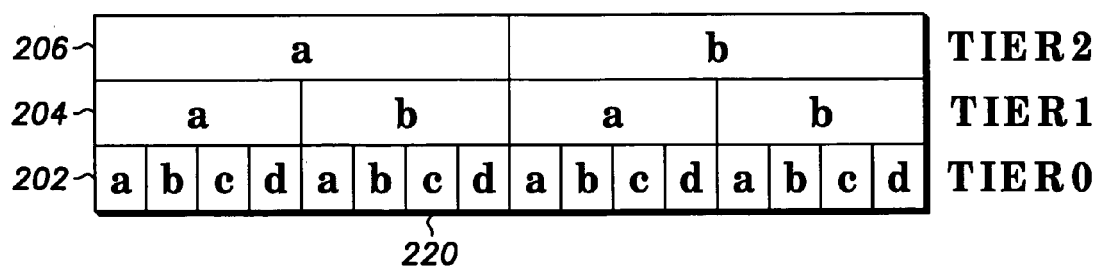
FIG. 2 shows a key encryption key hierarchy in accordance with a preferred embodiment of the present invention.

FIG. 2 shows a key encryption key hierarchy in accordance with a preferred embodiment of the present invention. Hierarchy 200 is a data structure that includes three tiers shown as horizontal layers stacked vertically upon one another. For example, tier 0, shown as layer 202 is the lowest level or "bottom" tier. Tier 1, shown as layer 204, is the next higher level tier. Tier 2, shown as layer 206, is the highest level or "top" tier. Any number of tiers can exist in hierarchy 200; three tiers are shown in FIG. 2.

As shown in FIG. 2, each labeled box within hierarchy 200 represents a different tier-group specific KEK, and each KEK in tier 0 corresponds to a node in a communications System, such as nodes 120 (FIG. 1). Each tier above the bottom tier includes KEKs that represent a group of KEKs at a lower level. For example, tier 2 has two groups: "a" and "b". For the purposes of this description, a group within a tier is denoted by the tier number designation and the group letter designation. For example, the two groups shown in tier 2 are referred to as "Tier 2a" and "Tier 2b." A group in a tier other than the top tier is denoted by its tier number designation and group letter designation as previously described and it is also prefixed by the identity of the next higher level group. For example, the two left-most groups in tier 1 are referred to as: "Tier2aTier1a" and "Tier2aTier1b." Likewise, the remaining two groups in tier 1 are referred to as "Tier2bTier1a" and "Tier2bTier1b."

Each group within each tier represents a separate KEK. KEKs in hierarchy 200 are said to be "tier-group specific." A tier-group specific KEK is a KEK unique to a group within a tier. Each tier-group specific, KEK can be uniquely identified using the naming convention described in the previous paragraph.

Each tier can be divided into any number of groups. Likewise, hierarchy 200 can have any number of tiers. In the example of FIG. 2, the hierarchy is not uniform, in part because each group in tier 2 corresponds to two groups in tier 1, but each group in tier 1 corresponds to four groups in tier 0. In some embodiments the hierarchy is uniform. Uniform hierarchies have the same number of lower level groups corresponding to any group within any tier. For such a system having "n" tiers, where each group corresponds to "y" groups of the next lower tier, the entire network can be re-keyed with (n+1)(y−1) messages. For example, for a system of 10 million nodes where groups of 10 are employed in each tier, a compromised node can be excised from the system with only (7+1)(10−1)=72 messages.

When new communications nodes are added to the system, a new bottom tier KEK is assigned to the new communications node. Higher level tier KEKs corresponding to the new communications node can be existing tier-group specific KEKs, or new groups and tiers can be created. In this fashion, hierarchy 200 can be freely expanded and collapsed either horizontally or vertically.

Hierarchy 200 represents a KEK hierarchy that can be stored in KEK hierarchy storage 112 within KMC 110 (FIG. 1). When hierarchy 200 is stored in KEK hierarchy storage 112, communications system 100 includes sixteen nodes 120, one for each KEK in tier 0. KEK 220 is tier-group specific KEK Tier2aTier1bTier0c. KEK 220 uniquely identifies a single node within the communications system, because KEK 220 is in the bottom tier. KEK 220 is labeled separately from other KEKs in tier 0 for the purpose of explaining an embodiment of the present invention. When KEK 220 represents a compromised node, a re-keying of the communications system involves securely transmitting a new TEK to all communications nodes except for the compromised node represented by KEK 220.

The KEK hierarchy 200 shown in FIG. 2 represents a data structure as used in one embodiment of the present invention. As indicated above, this data structure occupies a portion of KEK hierarchy storage 112 within memory 108 of KMC 110 (FIG. 1) and comprises at least two data structure members and preferably three data structure members, that correspond to tiers 202, 204, and/or 206. Each data structure member stores data in a plurality of fields or other organizational units.

The data contents for a first data structure member, such as tier 202, comprises a plurality of tier-group specific KEKs, each corresponding to a node in the communications system. The data contents for a second data structure member, such as tier 204, comprises a plurality of tier-group specific KEKs, each corresponding to a group of tier-group specific KEKs of the first data structure member 202. Likewise, the data contents for a third data structure member, such as tier 206, comprises a plurality of tier-group specific KEKs, each corresponding to a group of tier-group specific KEKs of the second data structure member 204. The particular organization of data structure members within data structure 200 is a matter of design choice.

Figure 3:
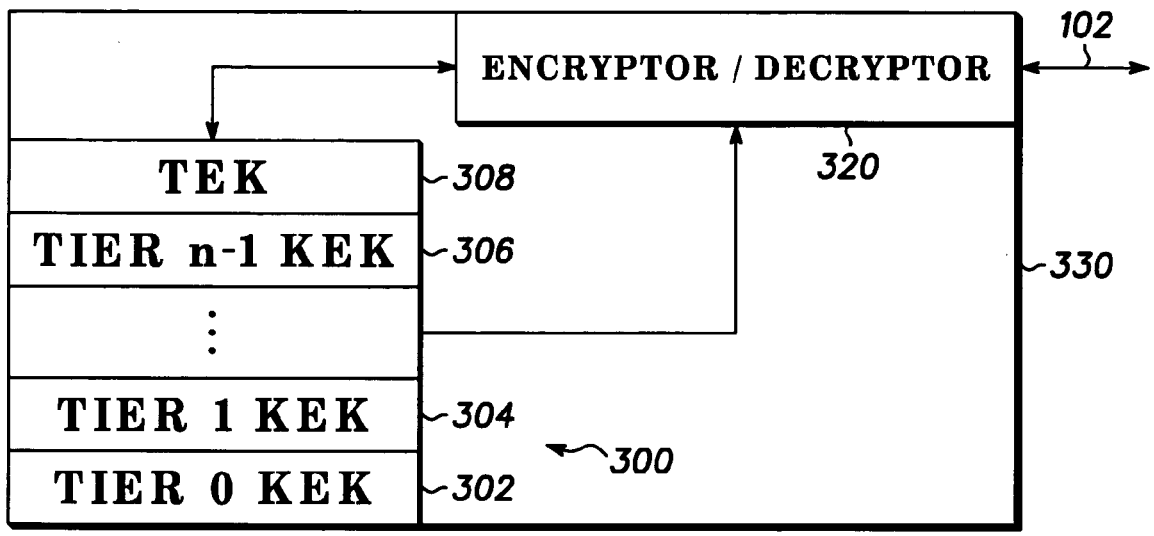
FIG. 3 shows a communications node in accordance with a preferred embodiment of the present invention.

FIG. 3 shows a communications node in accordance with a preferred embodiment of the present invention. Communications node 330 is a node in a communications system, such as one of nodes 120 in communications stem 100 (FIG. 1). Communications node 330 includes memory 300, that includes a list of tier-group specific KEKs, and encryptor/decryptor 320. Memory 300 can be any type of storage device capable of storing the list of KEKs. Examples include, but are not limited to, random access memory, read only memory, flash memory, hard disk or floppy disk storage, and memory on a plug-in personality module.

Communications node 330 also preferably includes a processor (not shown) or other suitable hardware capable of performing sequential operations. One skilled in the art will appreciate that communications node 330, as shown in FIG. 3, is simplified for the purposes of describing a particular embodiment of the present invention.

Memory 300 within communications node 330 also includes TEK 308 which is used to encrypt and decrypt traffic involving communications node 330. Communications node 330 can receive a new TEK 308 whenever the new TEK is encrypted using a KEK within memory 300. For example, referring now to FIG. 1, when the tier-group KEK used in message 104 is the Tier2a KEK, the encrypted TEK can be decrypted by any of communications nodes 120 having the Tier2a KEK present in entry 306 of the list of KEKs. Likewise, when the tier-group specific KEK used in message 104 is the Tier2aTier1b KEK, the encrypted TEK can be decrypted by any of communications nodes 120 having the Tier2aTier1b KEK present in entry 304 of the list of KEKs.

Memory 300 includes tier-group specific KEKs for each tier-group that includes communications node 330. The size of the list corresponds to the number of tiers included within the KEK hierarchy. The list of KEKs, as shown in FIG. 3, includes "n" entries. When communications node 330 is in a communications system represented by KEK hierarchy 200, "n" is equal to three, and the list has free entries. Entry 306 holds the top tier KEK, and entry 302 holds the bottom tier KEK.

When node 330 is the compromised node represented by KEK 220 (FIG. 2), tier 0 entry 302 holds tier-group specific KEK Tier2aTier1bTier0c, tier 1 entry 304 holds tier-group specific KEK Tier2aTier1b, and tier n−1 entry 306 holds tier-group specific KEK Tier2a. In this case, if the new TEK is broadcast within the communications system encrypted with any of these tier-group specific KEKs, the compromised node will also receive the new TEK.

Figure 4:
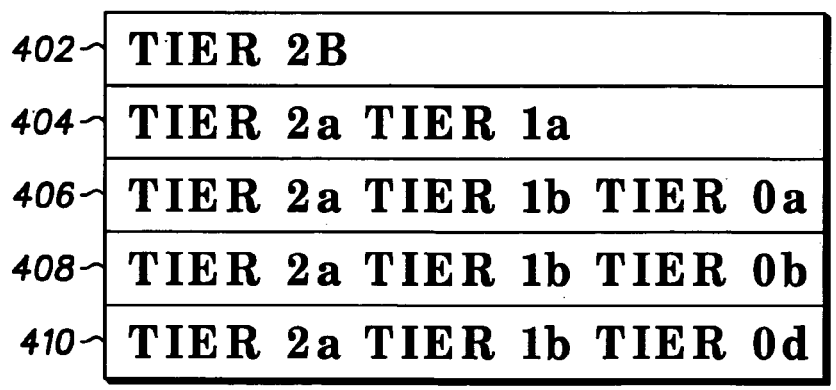
FIG. 4 shows a table of tier-group specific key encryption keys in accordance with a preferred embodiment of the present invention.

FIG. 4 shows a table of tier-group specific key encryption keys in accordance with a preferred embodiment of the present invention. Table 400 includes a list of tier-group specific KEKs, that when utilized to encrypt a new TEK, make advantageous use of hierarchy 200 (FIG. 2) to re-key every node except the compromised node using relatively few broadcast messages. Table 400 has five entries: entry 402, entry 404, entry 406, entry 408, and entry 410. When the compromised node is the node corresponding to KEK 220 (FIG. 2), the new TEK is broadcast five times. Each time the new TEK is broadcast, it is encrypted with one of the KEKs specified in table 400, and every node in the communications system except for the compromised node will be re-keyed.

When a new TEK is broadcast encrypted by tier-group specific KEK Tier2b as shown in entry 402, half of the network is re-keyed with a single message. Each communications node that includes tier-group specific KEK Tier2b within memory 300 (FIG. 3) is able to decrypt the new TEK. This corresponds to communications nodes represented by the right-most tier 0 KEKs in hierarchy 200 (FIG. 2). With one broadcast message, half of the communications system has been re-keyed. To finish the re-keying operation, every node in the remaining half of the communications system except for the compromised node is re-keyed.

In general, for the top tier, an encrypted TEK is broadcast for each group within the tier except for the group that includes a compromised node. In tier 2, this corresponds to group Tier2b and not Tier2a, because Tier2a is the group within tier 2 that includes the compromised node.

Entry 404 of table 400 includes tier-group specific KEK Tier2aTier1a. When this tier-group specific KEK is used to encrypt a new TEK, all nodes having this tier-group specific KEK in entry 304 of memory 300 are able to decrypt the message and receive the new TEK. This corresponds to four communications nodes corresponding to the left-most four KEKs in tier 0 as shown in FIG. 2. At this point, with two messages, 75 percent of the nodes in the communications system have been re-keyed. Four remaining nodes have not been re-keyed. One is the compromised node, and three others are nodes to be re-keyed.

The remaining three entries in table 400 hold bottom tier KEKs that are node specific. Entries 406, 408, and 410 each correspond to KEKs that uniquely identify a node other than the compromised node. After the new TEK is broadcast encrypted by each of these KEKs, every communications node except the compromised node has been re-keyed.

After every communications node except the compromised node has been re-keyed with a new TEK, secure communications can resume on channel 102 (FIG. 1) without the compromised node having access. Even though the compromised node does not have the new TEK, the compromised node still has valid KEKs for each group of which it is a part. In the example being set forth here, the compromised KEKs include KEKs Tier2a, Tier2aTier1a, and Tier2aTier1aTier0c. In a preferred embodiment of the present invention, KEKs Tier2a and Tier2aTier1a are replaced in all communications nodes except the compromised communications node. KEK Tier2a can be replaced in all communications nodes within the group represented by KEK Tier2aTier1a by encrypting a new KEK Tier2a using KEK Tier2aTier1a and broadcasting the result. KEK Tier2a and KEK Tier2aTier1b can be replaced in the communications nodes represented by entries 406, 408, and 410 by encrypting the new KEKs using each of the entries 406, 408, and 410, and broadcasting the results.

Figure 5:
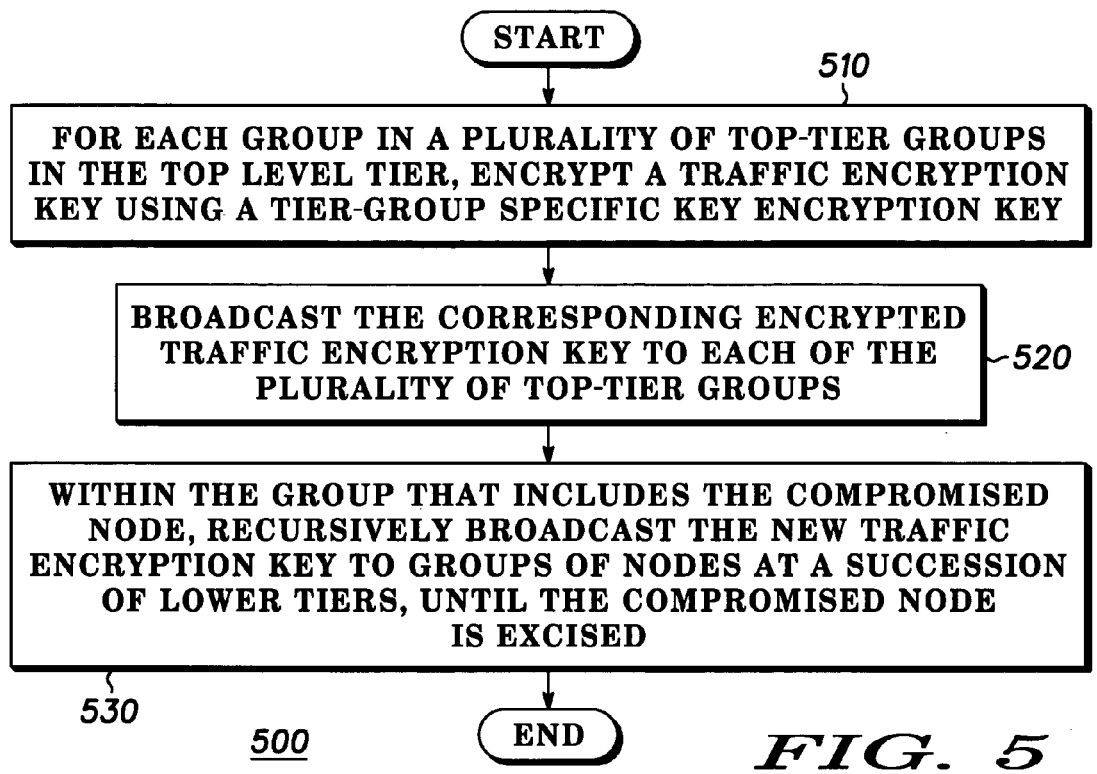
FIG. 5 is a flowchart of a method for excising a compromised node from a communications system in accordance with a preferred embodiment of the present invention.

FIG. 5 is a flowchart of a method for excising a compromised node from a communications system in accordance with a preferred embodiment of the present invention. Method 500 begins in block 510 when a TEK is encrypted using a tier-group specific KEK. This is performed for each group in a plurality of top tier groups in a top level tier.

In block 520, each of the encrypted TEKs produced in block 510 is broadcast As shown in block 520, the plurality of top tier groups to which the tier-group specific KEKs correspond does not include a group that includes the compromised node. Referring now to FIG. 2, an example of the combination of the actions of blocks 510 and 520 is the encryption of a new TEK using tier-group specific KEK Tier2b. The plurality of top tier groups includes, in this example, a single tier 2 group, namely Tier2a. If tier 2 had more than two groups, the plurality of top tier groups referenced in method 500 would include more than one group.

In block 530, the new TEK is recursively broadcast at a succession of tiers lower than the top level tier until the compromised node is excised. The recursive broadcast occurs within the group that includes the compromised node. For example, referring now to the example of FIG. 2, the new TEK is recursively broadcast to groups of nodes below tier 2 starting with the group represented by tier-group specific KEK Tier2aTier1a. The new TEK is recursively broadcast to groups in successively lower tiers until every communications node except the compromised node has received the new TEK.

Figure 6:
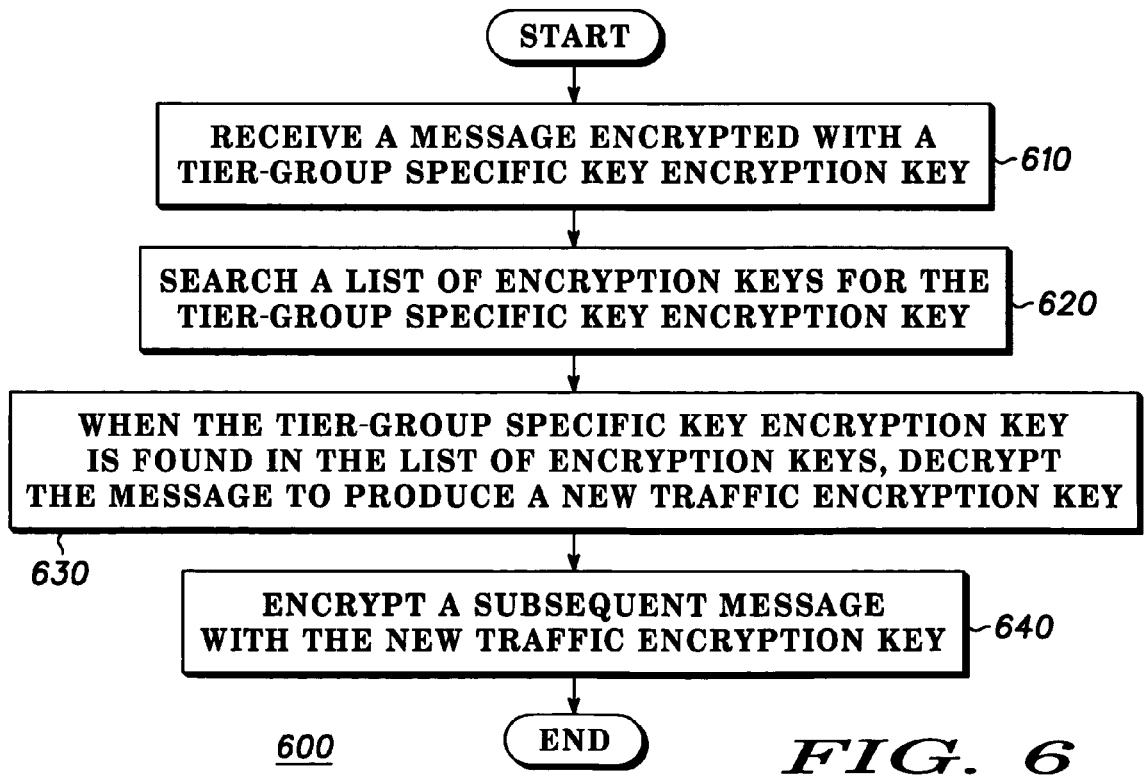
FIG. 6 is a flowchart of a method for operating a communications node in accordance with a preferred embodiment of the present invention.

FIG. 6 is a flowchart of a method for operating a communications node in accordance with a preferred embodiment of the present invention. Method 600 begins in block 610 when a message is received that is encrypted with a tier-group specific KEK. In block 620, a list of encryption keys is searched for the tier-group specific KEK. The list of encryption keys referred to in block 620 corresponds to the list of KEKs with memory 300 in communications node 330 (FIG. 3). If the tier-group specific KEK corresponds to any groups of which the communications node is a part, the tier-group specific KEK used to encrypt the message will be listed in memory 300.

In block 630, when the tier-group specific KEK is found in the list of encryption keys, the message is decrypted to produce a new TEK. At this point, the communications node performing method 600 has been re-keyed. In some embodiments, the new TEK is used immediately. In these embodiments, the next encrypted message produced by the communications node will utilize the new TEK In other embodiments, the new TEK is not used immediately. Instead, its use is delayed such that more than one communications node can switch to the use of the new TEK at substantially the same time.

In block 640, a subsequent message is encrypted with the new TEK. As described above, the subsequent message encrypted with the new TEK can be the very next message produced by the communications node, or it can be a message produced at a later time. In some embodiments, when the message is produced at a later time, it coincides with other communications nodes also switching to the new TEK.

Figure 7:
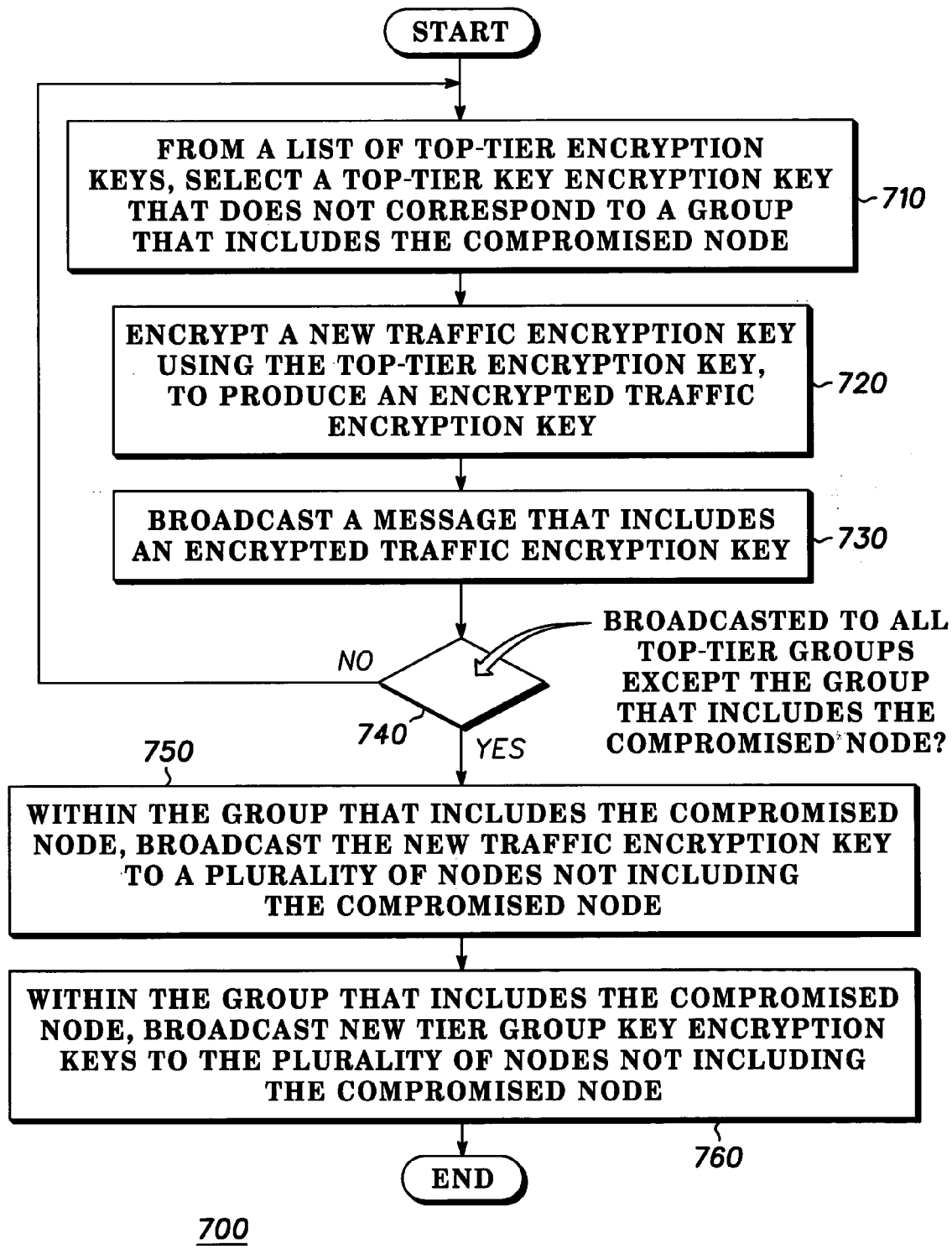
FIG. 7 is a flowchart of a method for operating a key management center to excise a compromised node in accordance with a preferred embodiment of the present invention.

FIG. 7 is a flowchart of a method for operating a key management center to excise a compromised node in accordance with a preferred embodiment of the present invention. Method 700 begins in block 710 when atop tier KEK is selected from a list of top tier KEKs. The selected top tier KEK does not correspond to a group that includes a compromised node. In block 720, a new TEK is encrypted using the KEK selected in block 710. An encrypted TEK is produced as a result, and a message including the encrypted TEK is broadcast in block 730.

In block 740, a deter on is made whether all top tier groups except the group that includes a compromised node have had messages broadcast thereto. If not, the actions in blocks 710, 720, and 730 are repeated. When all top tier groups except the group that includes a compromised node have been broadcast a message that includes the encrypted TEK, method 700 continues with block 750.

In block 750, the new TEK is broadcast to a plurality of nodes within the group that includes the comprised node. The plurality of nodes receiving the new TEK does not include the compromised node. Referring now to FIG. 2, the action of block 750 corresponds to broadcasting a new TEK encrypted with tier-group specific KEKs from tier 0. In the example set forth in FIG. 2, where the compromised node is represented by KEK 220, the tier-specific KEKs used are those listed in entries 406, 408, and 410 of table 400 (FIG. 4). After the action of block 750, the compromised node has been excised from the communications system because all communications nodes other than the compromised node have received a new TEK.

In block 760, new tier-group KEKs are broadcast to the same nodes receiving the new TEK as a result of actions in block 750. In the example set forth in FIG. 2, this corresponds to broadcasting a new Tier2a KEK encrypted with the Tier2aTier1a KEK, and broadcasting both a new Tier2a KEK and Tier2aTier1b KEK encrypted with the tier-group specific KEKS shown in entries 406, 408, and 410 of table 400 (FIG. 4). After the action of block 760, the compromised node has been excised from the communications system, and it has also had its list of tier-group specific KEKs invalidated.

Although the actions in blocks 750 and 760 are shown separately, in some embodiments they are combined For example, when a node or group of nodes receives a new TEK, it can also receive one or more new tier-group specific KEKs all encrypted using the same tier-group specific KEK.

In summary, the methods and apparatus of the present invention provide a mechanism for efficiently re-keying a large number communications nodes in a secure communications system. While we have shown and described specific embodiments of the present invention, further modifications and improvements will occur to those skilled in the art. For example, while the methods and apparatus of the present invention have been described with reference to excising a comprised node from a communications system, the methods and apparatus of the present invention also apply to other applications for efficient re-keying of communications nodes. For example, in some embodiments of the present invention, re-keying occurs periodically even when there is not a compromised node.

We desire it to be understood, therefore, that this invention is not limited to the particular forms shown and we intend in the appended claims to cover all modifications that do not depart from the spit and scope of this invention

What is claimed is:

1. A method of excising a compromised node from a community of nodes capable of information sharing comprising:
   for each group in a plurality of top tier groups in a top level tier, encrypting a new traffic encryption key using a top tier-group specific key encryption key, wherein the plurality of top tier groups excludes a group that includes the compromised node;
   broadcasting the new traffic encryption key to each of the plurality of top tier groups in the top level tier; and
   within the group that includes the compromised node, recursively broadcasting the new traffic encryption key to groups of nodes at a succession of lower tiers, until the compromised node is excised, wherein recursively broadcasting comprises:
   for each of the groups of nodes in the succession of lower tiers, each of the groups of nodes excluding a lower tier group that includes the compromised node, encrypting the new traffic encryption key using a lower tier-group specific key encryption key.

2. The method of claim 1 wherein each tier in a progression of lower tiers comprises a plurality of groups, one group of the plurality of groups including the compromised node, and wherein recursively broadcasting comprises:
   for each tier in the succession of lower tiers, broadcasting the new traffic encryption key to a subset of the plurality of groups, such that the compromised node does not receive the new traffic encryption key.

3. The method of claim 1 wherein recursively broadcasting comprises:
   broadcasting the new traffic encryption key to a plurality of lower tier groups in a lower tier, the plurality of lower tier groups excluding a lower tier group that includes the compromised node; and
   within the lower tier group that includes the compromised node, broadcasting the new traffic encryption key to a plurality of nodes in a lowest tier, wherein the plurality of nodes excludes the compromised node.

4. The method of claim 3 wherein the compromised node is a node coupled to a wireless communications system.

5. The method of claim 3 wherein the compromised node is a node coupled to the Internet.

6. A method of operating a key management center to excise a compromised node comprising:
   from a list of top tier key encryption keys, selecting a top tier key encryption key that does not correspond to a group that includes the compromised node;
   encrypting a new traffic encryption key using the top tier key encryption key, to produce a first encrypted traffic encryption key;
   broadcasting a message that includes the first encrypted traffic encryption key;
   from a list of lower tier key encryption keys, selecting a lower tier key encryption key that does not correspond to the group that includes the compromised node;
   encrypting the new traffic encryption key using the lower tier key encryption key, to produce a second encrypted traffic encryption key; and
   broadcasting a message that includes the second encrypted traffic encryption key.

7. The method of claim 6 further comprising repeating the actions in the method for all top tier groups except the group that includes the compromised node.

8. The method of claim 6 further comprising:
   within the group that includes the compromised node, broadcasting the new traffic encryption key to a plurality of nodes excluding the compromised node.

9. The method of claim 8 further comprising:
   within the group that includes the compromised node, broadcasting new tier group key encryption keys to the plurality of nodes excluding the compromised node.

* * * * *